Figures 10, 11, 12:
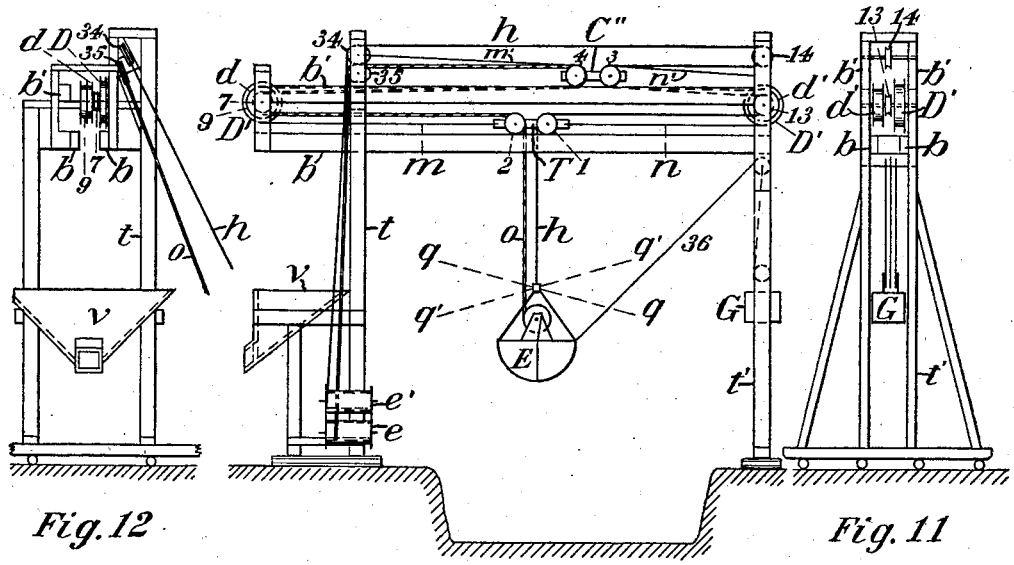

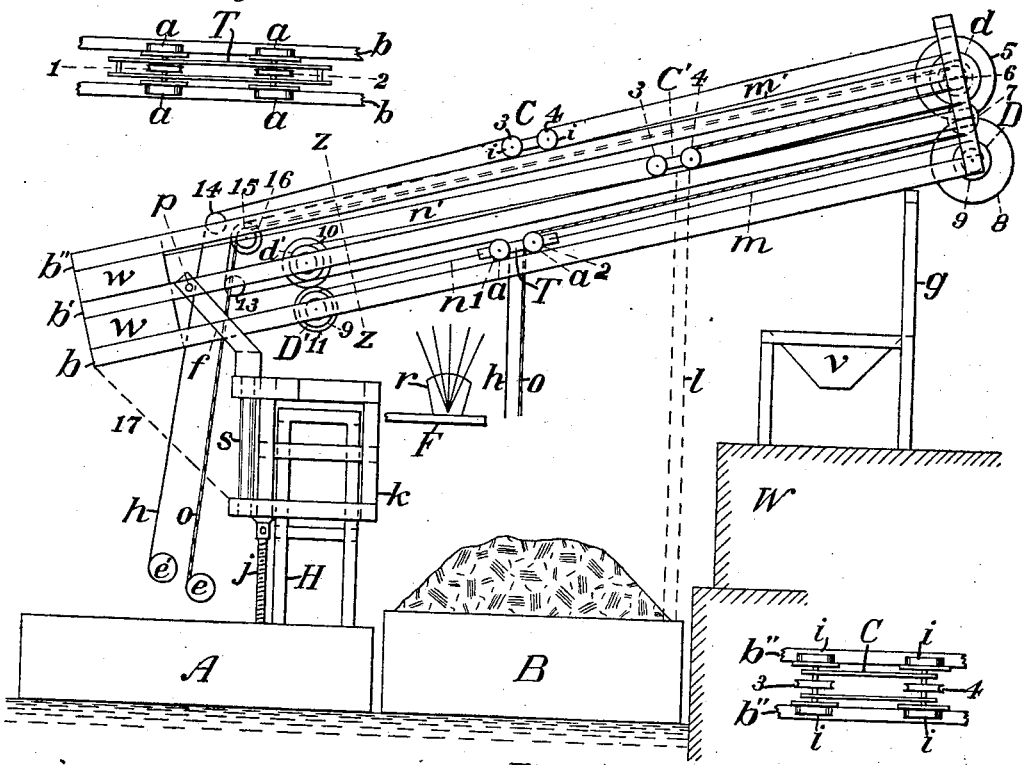
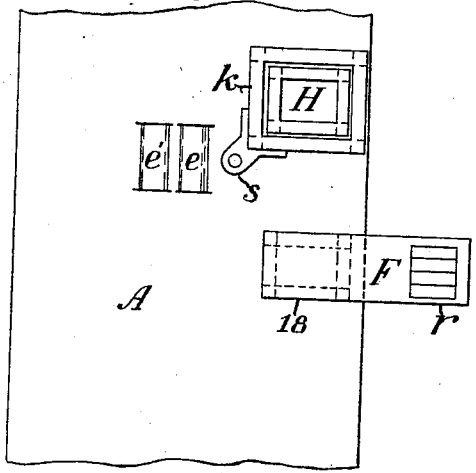
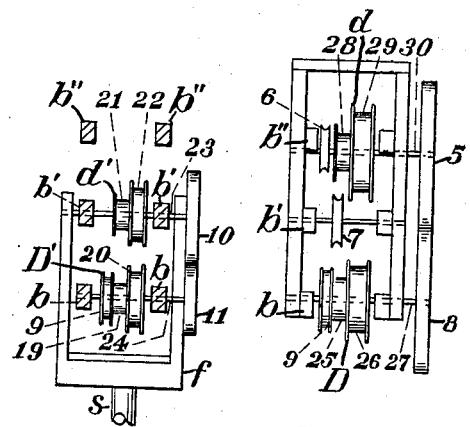

R. F. BENNETT.
LOAD HANDLING APPARATUS.
APPLICATION FILED APR. 14, 1909.

1,033,078.

Patented July 23, 1912.

5 SHEETS—SHEET 2.

Witnesses:
B. F. Underwood.
R. B. Ellus.

Inventor:
Raymond F. Bennett
by Allis Spear Jr.
Atty.

R. F. BENNETT.
LOAD HANDLING APPARATUS.
APPLICATION FILED APR. 14, 1909.
1,033,078.
Patented July 23, 1912.
5 SHEETS—SHEET 3.
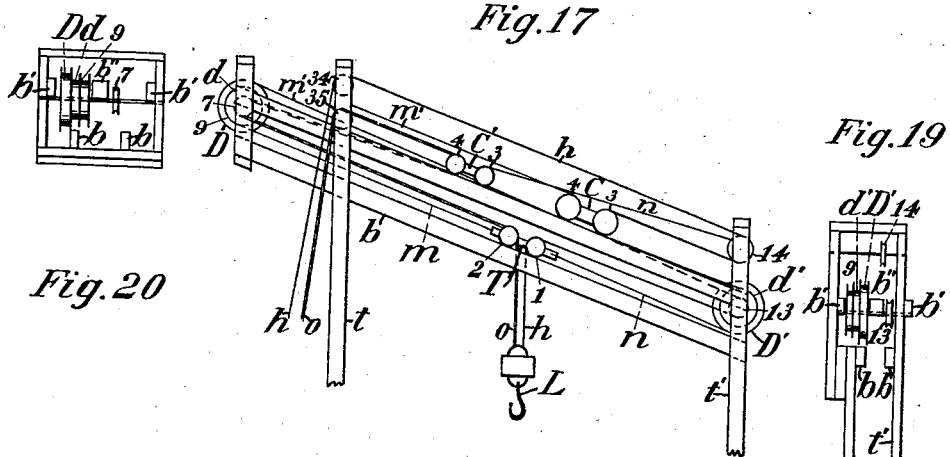
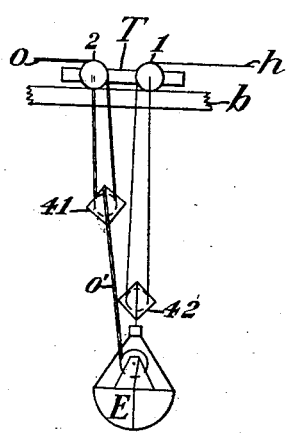
Witnesses:
B. F. Underwood.
R. B. Ellis.
Inventor:
Raymond F. Bennett
by Ellis Spear Jr.
Atty.

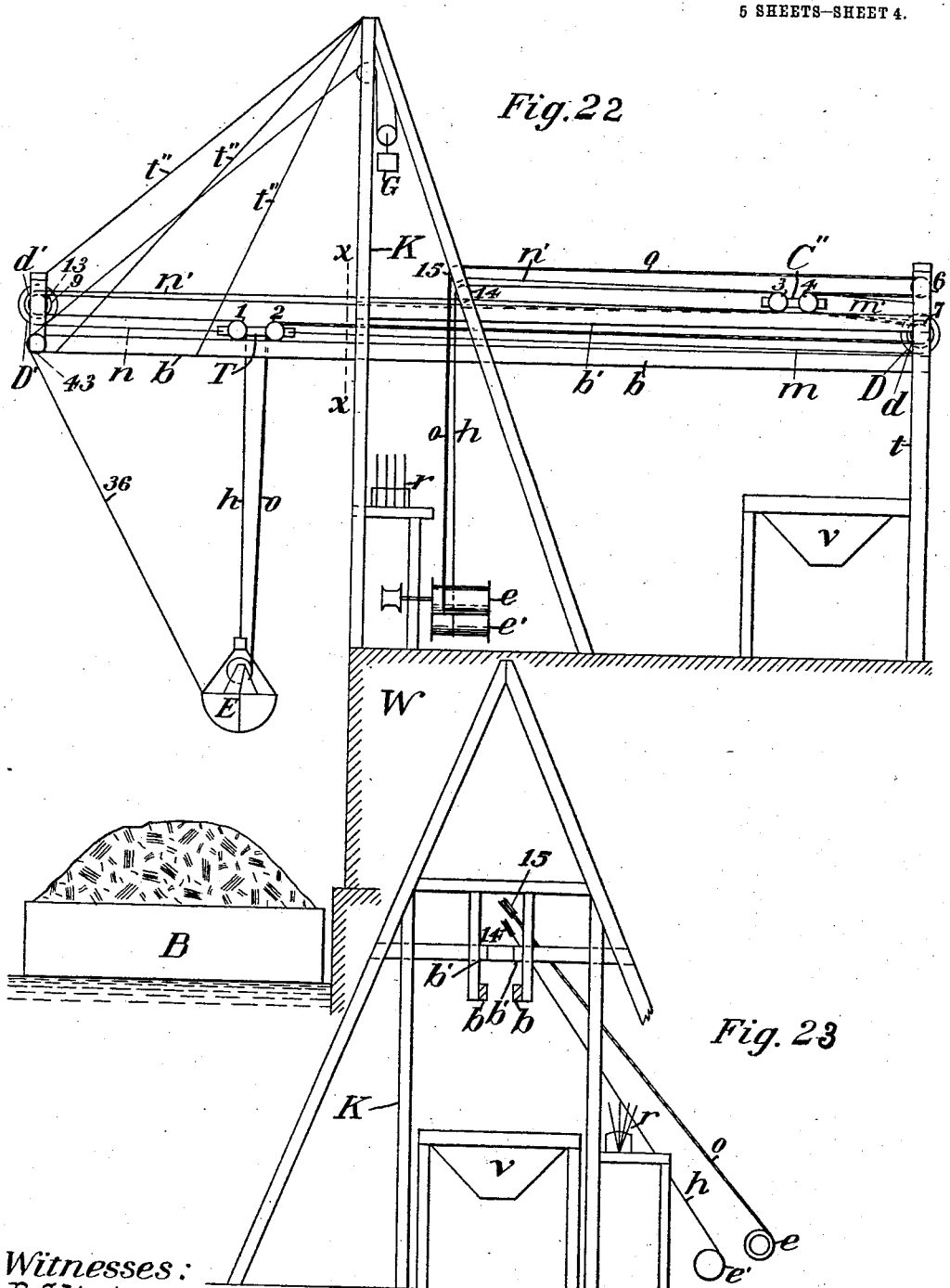

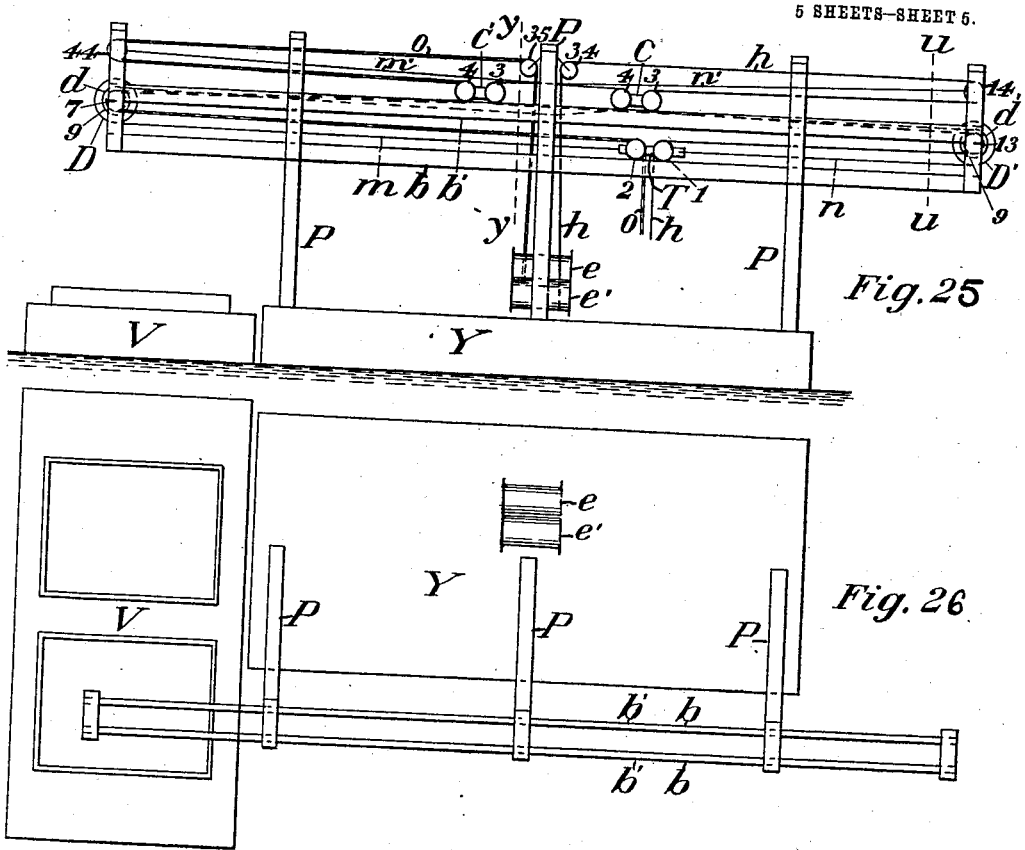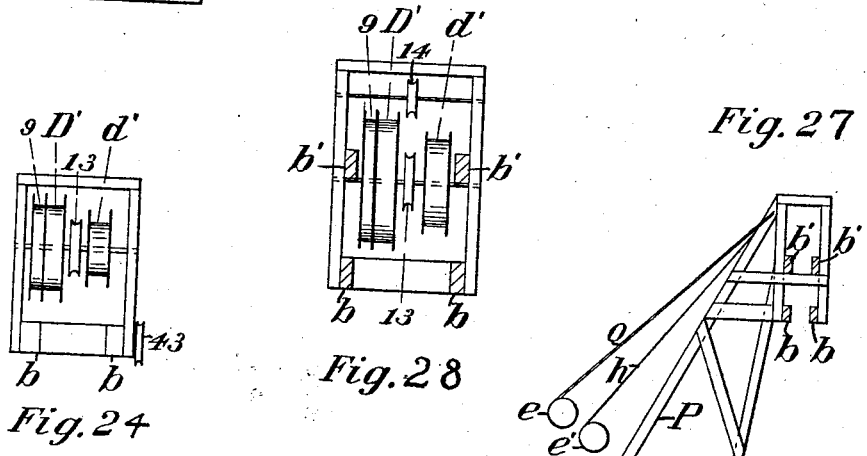

UNITED STATES PATENT OFFICE.

RAYMOND F. BENNETT, OF PORTLAND, MAINE.

LOAD-HANDLING APPARATUS.

1,033,078.  Specification of Letters Patent.  Patented July 23, 1912.

Application filed April 14, 1909. Serial No. 489,926.

*To all whom it may concern:*

Be it known that I, RAYMOND F. BENNETT, a citizen of the United States, residing at Portland, county of Cumberland, State of Maine, have invented certain new and useful Improvements in Load-Handling Apparatus, of which the following is a specification.

This invention relates to load handling apparatus and particularly to the operating of a load carrying grab, bucket, hook, or other device.

In the loading or unloading of vessels, barges, and the like, and in excavating, dredging, and in similar operations, certain common problems develop in the manipulation of the load carrying means and in the transfer and delivery of the same.

While involving many details of structure my invention has to do broadly with the operation and conveyance of a load and in the manner of securing such operation from those sources of power and control which are available for such purposes.

I have for my particular object, therefore, the provision of an efficient apparatus capable of use with such an ordinary power device as the usual drum contractor's hoisting engine and particularly a double friction drum engine requiring the attendance of but a single operator.

In my invention and in the apparatus which I will hereinafter disclose and discuss as illustrative embodiments of my invention, it will be seen that I treat the problem on the basis of a stressing operation effective longitudinally of my boom.

As will be pointed out in the following specification, I am able to secure by my specification, the construction, disposition and boom and the construction, disposition and treatment and the arrangement of the moving parts thereof, a complete and effective control of the speed and direction of my load.

In the discussion in the specification of the illustrative embodiments shown in the drawings of this specification I employ corresponding reference letters and numerals to indicate like parts throughout.

Figures 13, 14, 15, 16:
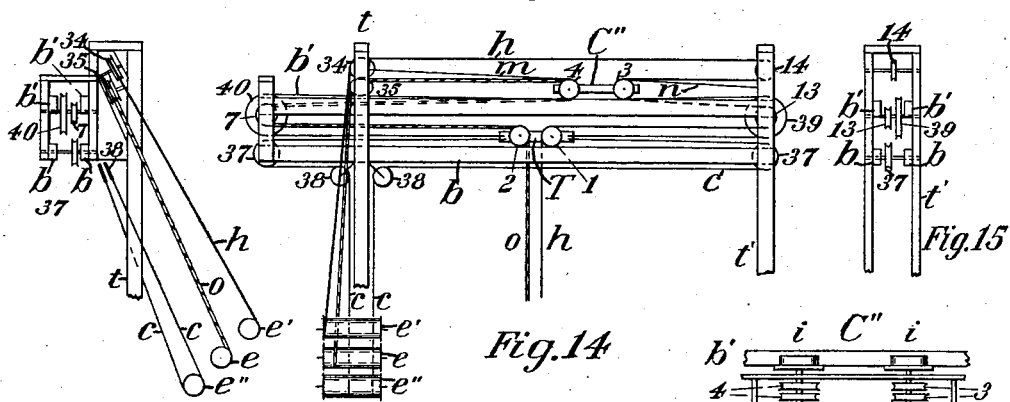
Figures 7, 8, 9:
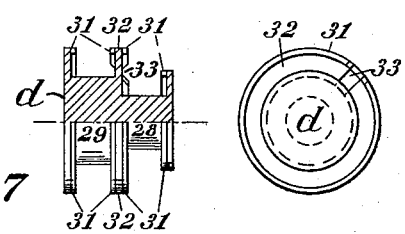

In the drawings:—Figure 1 is an elevation of an unloading device involving my invention, Fig. 2 is a partial plan of the same, Fig. 3 is a view of the right end of the boom, Fig. 4 is a section on the line z—z of Fig. 1 looking toward the left, Fig. 5 is an enlarged plan of the take-up carriages, Fig. 6 is an enlarged plan of the trolley or carrier, Fig. 7 is a partly sectioned side view of one of the differential drums, Fig. 8 is an end view from the right of the same, Fig. 9 is a diagrammatic detail of the brake used on the drums, Fig. 10 is a side view of a machine of the gantry type shown in use as a cellar excavator, Fig. 11 and Fig. 12 are views from the right and left respectively of the device of Fig. 10, Fig. 13 is an enlarged plan of the take-up carriage, Fig. 14 is a side view of a modification of a device similar to that shown in Fig. 10, Figs. 15 and 16 are end views from the right and left respectively of Fig. 14, Fig. 17 is a side view of a further modification of the device above mentioned for working on a fixed inclination, Figs. 18, 19 and 20 are respectively a plan, a right end view, and a left end view of the boom of Fig. 17, Fig. 21 is a detail illustrating a modification of the tackle of the operating and holding lines, Fig. 22 is a side view of my invention embodied as a coal discharge tower, Fig. 23 is a section on the line x—x, Fig. 24, looking toward the right, Fig. 24 is an end view of the boom from the left of Fig. 22, Fig. 25, is a view of a dredge embodying my invention, Fig. 26 is a plan view of the float, track and scow with the gearing removed, Fig. 27 is a side sectional view on the line Y—Y, Fig. 27, looking from the left, and Fig. 28 is a section on the line U—U, Fig. 27, also looking from the left.

The parts common to all of these modifications as set forth in the several figures are indicated in general as follows:

$b$ $b$, $b'$ $b'$, and $b''$ $b''$ are longitudinal members of a boom or carrying bridge and in most instances these members constitute superimposed trackage for a carrier or trolley carriage T from which the load is directly suspended.

C, C' and C'' are take-up carriages which work either singly or in pairs on the superimposed tracks of the longitudinal members.

D and $d$, D' and $d'$ are differential drums formed integral or connected together so as to provide for different surface speeds on a common axis, or different axes.

$h$ and $o$ are the operating lines. $h$ is the holding line which is provided at its end with a pair of lines to engage the jaws of the grab or bucket E and $o$ is the operating line for effecting the opening and closing of said grab.

$e$, $e'$ and $e''$ are the winding drums of hoisting engines.

$v$ indicates a hopper and $t\ t'$ are supporting towers.

In Figs. 1 and 22 W indicates a wharf, B a vessel to be unloaded, A indicates a vessel carrying the discharge device, and in Fig. 25 Y indicates a hull of a dredge and V the scow to receive the discharge. 36 is a tag line attached to the grab bucket and carrying a weight G on its opposite end for preventing the rotation of the grab about its vertical axis.

Having thus indicated the general parts of this device I will take up the discussion in detail of the several modifications shown describing the structure and also the operation of each.

The structure shown in Fig. 10 I will treat first as being perhaps the most simple and as best illustrating the principles of my invention. Referring then to Figs. 10, 11 and 12, I provide a boom arranged as a carrying bridge on the towers $t\ t'$. This boom comprises longitudinal members $b\ b$ and $b'\ b'$. The boom bridges the place to be excavated indicated in Fig. 10 and slightly over-hangs the tower $t$ on the left to permit the delivery of material into the hopper $v$ which is arranged just outside of the tower $t$ on that side. The direction of carry of the load is, therefore, from right to left in Fig. 10. The longitudinal members $b\ b$ and $b'\ b'$ form trackage for the carrier carriage or trolley T while the members $b'\ b'$ form trackage for the slack-taker C''.

The holding line $h$ is fastened as above described to the jaws of the grab and passes up over the sheave 1 of the carrier trolley T, thence to the right where it passes around the sheave 13 on the shaft of the differential drum D', from which it passes to the slack-taker C''. The slack-taker C'' is a carriage, as shown in Fig. 13, and is provided with a pair of sheaves at each end. The holding line $h$ passes around one of these sheaves and back to the tower $t'$ where it passes around a sheave 14 and again returns to the left this time across the sheave 34 on the tower $t$ and is led down to the winding drum $e'$ of the engine. The operating line $o$, which acts to open or close the buckets in conjunction with the holding line $h$, is attached to the power wheel of the grab E and runs up over the sheave 2 of the carrier trolley T. (For the plan view of the carrier trolley T see Fig. 6, Sheet 1.) It is to be noted that these two lines $h$ and $o$ both pass over the inside of the sheaves 1 and 2 of the trolley T and diverge, running in opposite directions. The line $o$ passes to the left from the sheave 2 across the boom to the sheave 7 on the shaft of the differential drums D $d$ which are located on the end frame of the boom instead of on the tower as on the right. From the sheave 7 the line $o$ runs to one of the sheaves on the left of the slack-taker C'' from which it passes again to the left over the sheave 35 to the drum $e$ on the engine. $n$, $m$ are control ropes for the carrier trolley T. The control rope $n$ is attached to the right of the trolley T and runs to the larger differential drum D' and is attached to its periphery so as to wind or unwind thereon according to the direction of the rotation of the drum. The drum control rope $n'$ is attached to the smaller differential drum $d'$ being wound thereon in the opposite direction to that in which $n$ is wound on D'. The drum control line $n'$ runs from the differential drum $d'$ to the slack-taker C'' over the unoccupied sheave on the right of the slack-taker (the other sheave is occupied by the line $h$) and passes to the right again to the tower $t'$ to which it is made fast. The carrier trolley control rope $m$ runs from the left of T to the differential drum D to which it is attached in the same manner that the control rope $n$ is attached to D'. The drum control rope $m'$ is attached to the smaller differential drum $d$ in the same relation to the rope $m$ that the rope $n'$ bears to $n$ and runs from $d$ to the unoccupied sheave on the left of the slack-taker C'' (the other sheave being occupied by the rope $o$) passes under it and back to the left to the tower $t$ to which it is made fast. The differential drums D, $d$ bear the same surface speed relation to each other as do the differential drums D' $d'$. The brake drum 9 is fixed on the same shaft as D and $d$, as appears in Fig. 12 and is provided with a band brake 12, as indicated in Fig. 9, so that the rotation of the shaft D, $d$ may be arrested and controlled by the operator at the engine drums $e$, $e'$.

The operation of this apparatus will be as follows: Suppose that the lines $h$ and $o$ are slacked and that the carrier T is pushed from its position shown in Fig. 10 to the right of the boom, the pull of the carrier T on the line $m$ will cause the drums D and $d$ to rotate taking in on the line $m'$ and causing the slack-taker C'' to travel to the left a distance less than half the distance traveled by T to the right. The line $n'$, being hauled out by this movement of C'', causes the drums D' and $d'$ to rotate at the same speed as $d$, D so that the line $n$ is taken in on the drum D' and kept tight. In this way the lines $m$ and $m'$, $n$ and $n'$ may be kept at the same degree of tightness throughout the movement of T and this would be true for any amount of travel, under these circumstances, of T from one end of the boom to the other in either direction. If the brake 12 is applied to stop the rotation of the drums D $d$ it will also stop rotation of the drums D' $d'$ and also prevent any movement of the carriage C″ and any movement of the carrier T. Suppose now that the grab E is open on the ground and that the brake 12 be set to prevent any lateral movement of the carrier T. If now the drum $e$ is rotated to stress and take in the line $o$ the grab E will be closed and filled. Continued taking in on the line $o$ will raise the grab and if at the same time the drum $e'$ is also started to run at the same speed any slacking of the rope $h$ will be prevented and the grab will be suspended over the point from which the load was removed. If now rotation of the drums be stopped and lines $o$ and $h$ held, the grab will be held stationary because each of the ropes $o$ and $h$ holds half of the load and the tendency of each to move the carrier T offsets that of the other. If now the operator releases the rope $h$ so that the rope $o$ sustains the full load $h$ is unstressed and the control line $n$ is put under a stress equal to that of $o$. This places on the differential controlling line $n'$ a still greater stress due to the increased leverage of the drum D′ over $d'$. Under these circumstances the slack-taker C″ is under stress in opposite directions on one side being under the influence of the load in $o$ and on the other side under the stress of $n$ and $n'$ which is exerting through the differential drums an increased stress over $o$. The line $m'$ is, therefore, stressed but is held by the brake 12. To start the load toward the left it is, therefore, only necessary to relieve the brake pressure and its stress on $m'$. The slack-taker C″ is thus permitted to be moved to the right under the stress of $n'$ which has the advantage of the differential D′ $d'$ over $o$. The carrier T may then be moved to the left at a speed more than twice that of the slack-taker C″ and, therefore, the slack of $o$ could not be taken up as fast as the carrier T moves to the left. This would pay out the line $o$ so that at the same time that the grab E was carried to the left by the carrier T, it would descend and its path would be resolved into a line parallel to $q' \ q'$. If after the brake 12 is relieved the rope $o$ is taken in by its drum $e$ at a suitable speed the grab may be prevented from descending or even upraising. The speed of travel of the carrier T will be controlled by the speed of paying out on the rope $h$ from the drum $e'$ or may be controlled by the brake 12. In this manner the grab E may be carried to a point over the hopper $v$ when the rope $h$ is held and the rope $o$ released to open the grab E and deposit the contents in the hopper $v$. The rope $o$ is then released and the grab E will then begin to travel to the right by reason of the stress of its own weight on the rope $h$ which is being held and as long as $h$ is held the grab will descend along a line parallel to $q \ q$ unless the rope is taken in to make the carry of the grab straight across or paid out to drop it at some intermediate point from the boom. This traversing movement in the return may be controlled by the rope $o$ or by the brake 12 or by both. Thus, by the rotation of the drums $e \ e'$ and the brake 12, it will be seen that the grab E may be made to travel in any path in the vertical plane under the boom. It is to be noted that the line $o$ preferably leads from the carrier T in the direction in which it is desired to carry the load although the load might be carried in the opposite direction though less effectively. During the return of the grab E the brake 12 would be set while the line $o$ was slacked to permit the line $h$ to open and carry the grab. The controlling ropes $m \ m'$ would then be stressed the same as $h$ with the increase of the differential drum D over $d$ held by the brake. If then the brake 12 be slacked the differential drums will rotate in a direction to pay out $m$ permitting the carrier T to move to the right, owing to the advantage of leverage of D over $d$. At the same time $m'$ would be taken in on the drum $d$ causing the slack-taker C″ to travel to the left at a speed less than half that of the carrier T and at a speed less than sufficient to take up the rope $h$ by which the grab E would descend as it crossed to the right, its motion being resolved into a path parallel to $q \ q$.

In Figs. 17, 18, 19 and 20 the boom is supported on the towers $t \ t'$ to form a bridge having a fixed inclination. I have shown in these figures, however, two slack-takers which are lettered C and C′ which work on a double track-way formed by the interposition of a broad rail $b''$ between the upper rails $b'$. Each one of these slack-takers is provided with a pair of sheaves. The reeving of the operating lines $o$ and $h$ is the same as described in the apparatus shown in Fig. 10 with the exception that the line $o$ passes from the sheave 7 to the sheave 4 in the carriage C′ and the line $h$ passes from the sheave 13 around the sheave 3 in the carriage C. The control rope $n'$ passes from the drum $d'$ around the sheave 3 in the carriage C′, thence to the right as before and is made fast to the tower $t'$. The control rope $m$ runs from the carrier T to the drum $d$ and the control rope $m'$ runs from the drum D around the sheave 4 in the slack-taker C thence to the left and is made fast to the tower $t$. In this device both pairs of differential drums D $d$ and D′ $d'$ are so proportioned as to give to the path of the load a downward inclination when one operating line is held and the other released. In this figure I have shown a weighted hook L substituted for the grab shown in Fig. 10. In this apparatus the inclination of the boom makes it necessary that the relation of the differential drums D and d be different from the relation of D' and d' and it is for this reason that two slack-takers C and C' are employed. At the proper inclination of the boom the differential drums D and d might be replaced by a simple sheave such as is indicated at 40 in Figs. 14 and 16. The operation of this apparatus is similar to that described in connection with Fig. 10 except that there are two brakes 12 to be manipulated instead of one.

In the apparatus shown in Figs. 1 to 9, inclusive, I have provided for the unloading of a vessel B laid alongside of a wharf W by apparatus carried on a float A laid outside of the vessel B. On the float A is a tower H on which is a sliding frame k the height of which may be regulated by means of a jack J or any other suitable contrivance. The carriage k supports a spindle s set in a vertical bearing and free to rotate about its vertical axis. On the upper end of the spindle s is an outwardly turned fork f in which the boom is pivoted on the pin p. The boom is partly counterweighted by the load w w and disposed between the ends of the longitudinal members b b' b'' so that it nearly balances on its point of pivot but with a slight preponderance on its long end. The boom may be swung on the pin p from a horizontal to a vertical position by any suitable means. The swinging motion of the boom permits it to be laid longitudinally of the float A so as to be out of the way when not in use. When in operation the boom is swung over the vessel or the place either from which or to which the load is to be carried. When in use the unbalanced weight of the boom is supported by a gallows frame g on which the boom rests or by legs l which are fastened loosely to the boom and dropped down to find a firm bearing. On the float A is another tower 18 which supports a platform F indicated in Fig. 2 on which may be mounted the operating levers in a rack as indicated at r so that the operator may have a good view of the grab throughout its path. In this apparatus the drums D d and D' d', as shown in Figs. 3 and 4, are set on different shafts 27 and 30 geared together by 8 and 5, and 24 and 23 are geared together by 11 and 10. This permits the differential drums D d and D' d' to be formed with two or more parts of different diameters. As shown, these parts have each two respective diameters i. e., 26 and 25; 29 and 28; 20 and 19; 22 and 21. As will be seen by reference to Figs. 7 and 8, each drum is formed with a flange between the different parts and this flange has a beveled notch 33 in it so that the rope in winding on the same may be passed from one drum to another through the notch. These drums whether stepped or not are provided on the inner edges of their flanges with rims 31 which over-hang the drum proper for the purpose of deflecting the rope as it reaches each side of the drum to cause it to spool back and return and to prevent its winding up as a spiral by which it is, of course, quickly changed as to its effective diameter and interferes with the proportion of the relative speeds of the parts. The gears 5, 8, 10, 11 and the differential drums (D) 25, 26, (d) 28, 29, (D') 19, 20, (d') 21, 22, are so relatively proportioned as to give a variety of surface speeds permitting a suspended load to descend along the line $q\ q$ (indicated in Fig. 10) when the line $o$ is released, and along the line $q'\ q'$ (see Fig. 10) when the line $h$ is released for all working inclinations of the boom. These speeds should be adjusted to suit the inclination of the boom by throwing the controlling lines $m\ m'$, $n\ n'$ from one step to another of their respective drums.

The operating cables of the machine shown in Fig. 1 are as follows: It will be noted that in Fig. 1 the carry of the load is in the opposite direction from that heretofore considered, i. e., from left to right. The operating line $o$, therefore, runs over the sheave 2 in the carrier T to the sheave 7, thence to the sheave 4 of the slack-taker C', thence to the sheave 6 on the upper drum shaft 30 ($d$), thence to the sheave 15 on the other end of the boom and to the drum $e$.

It is to be noted that the longitudinal members of the boom in this device are three in number $b$, $b'$, and $b''$. This forms three sets of tracks, on the lower one of which the carrier T rests, on the middle one of which the slack-taker C' runs, while the third one forms the trackage for the slack-taker C. The line $h$ leads over the sheave 1 in T to the left to sheave 13, up over the sheave 16 to the sheave 3 in C, thence back over the sheave 14 to the engine drum $e'$. The controlling lines $m$, $m'$, $n$, $n'$ are reeved on to the differential drums and on to the slack takers C, C' in the same manner as there described in connection with Fig. 17, the only difference being that of the superimposed relations of the track $b''$ over $b'$ and the changed disposition of the drums D, $d$, D' and $d'$. This device will operate, therefore, in the same manner as before described taking material from the vessel B and delivering it into the hopper $v$.

In case a weighted hook, such as L shown in Fig. 17 is used one of the lines $o$ or $h$ might be omitted.

The device as rigged in Figs. 14, 15, 16 is operated by a special engine and preferably by two operators. This engine would be of a three-drum type, and the arrangement of the operating lines $o$ and $h$ is the same in these figures as in Figs. 10, 11 and 12, previously described. The control line $m$ is attached to the carrier T and passed around the sheave 40 around the sheave 4 in the carrier C″ and thence attached to the tower $t$ on the left. The control rope $n$ is attached to the carrier T, passed around the sheave 39 and then around the sheave 3 in the carrier C″, then to the right, being fastened to the tower $t'$. If one operating line is held and the other released while the bucket is suspended no traversing movement of the carrier occurs. The endless traversing rope $c$ is turned around the drum $e''$ several times and the ends are carried in opposite directions over sheaves 37 and 38 to points of attachment at opposite ends of the carriage T. The traversing of the carrier T is caused by revolving the drum $e''$ in one direction or the other in accordance with the direction desired by any well known reversing means. This traversing of the carrier does not alter the height of the grab except, of course, as the boom is inclined. The traversing, hoisting and lowering of the bucket may be carried on independently or simultaneously, as desired. In this arrangement also either the line $o$ or the line $h$ may be left out and the other one employed to operate the weighted hook L for handling articles adapted to be raised and carried in that manner.

Figs. 22 and 23 show an adaptation of my invention as a coal hoisting tower. The carrying boom in this device would comprise members $b$ $b$ and $b'$ $b'$ supported by the tower K on the left and the tower $t$ on the right. That portion of the boom on the left which overhangs, is supported by the tower through ties $t''$ $t''$ $t''$. In this construction the cables and operation thereof are similar to that of the machine first described in connection with Fig. 10.

For dredging purposes my invention may be arranged as follows special reference being had to Figs. 25 to 28, inclusive. In Figs. 25 and 26 V is a hopper scow laid along side the dredge hull Y to receive the dredged material. The carrying boom comprises the longitudinal members $b$ $b$, $b'$ $b'$ and is supported on the frames P built to slightly over-hang the side of the dredge so as to permit room for the operation of the bucket clear of the side. The connection and arrangement of the lines are similar to that described in connection with Figs. 17 to 20, inclusive, in that they embrace two take-up carriers although in this device these carriers work on opposite ends of a single track each one being independent of the other. This would probably be a desirable arrangement in the case or use of a long boom as in the use of a single slack-taker in such a rigging as in Fig. 10 the control lines might ride or pile up on the drums in such a way as to place too great stress on them and consequently break them or else to permit too much slack in them.

The operation in using the machine shown in Figs. 25 to 28, inclusive, is similar to that shown in Figs. 10 to 12, inclusive. The left end view of the boom is similar to that shown in Fig. 28. A dredge of this type would have many advantages principally in that it would permit the operation of a heavier dredge bucket and would permit the cutting of a wider swath on one traversing of the dredge over the area to be excavated.

Obviously other modifications than those shown in my drawings could be made and various modifications involving one or more of the features could be made by combining one or more of these elements, all within the limits of the appended claims, without departing from the spirit of my invention.

What I therefore claim and desire to secure by Letters Patent is:

1. In a device of the class described, means for supporting a carrier, a carrier longitudinally movable thereon, a plurality of means for supporting a load from said carrier, one of said means being connected to give said carrier a tendency to move in one direction and the other of said means being connected to give said carrier a tendency to move in the opposite direction, means for limiting the maximum traversing tendency to less than the stress of the supporting means, and means for operating the load supporting means.

2. In a device of the class described a carrier, means for supporting said carrier, a pair of flexible load supporting members, one of said members being associated with said carriers to give it a tendency to move in one direction and the other of said members being so associated thereinto as to give said carrier a tendency to move in the opposite direction whenever said supporting members are individually stressed, means for automatically taking up and paying out said flexible members respectively, at such relative speed that the scope taken or yielded by said taking up means shall not equal that yielded or taken up by said carrier.

3. In a device of the class described, a longitudinally movable carrier, means for supporting said carrier, a grab, an operating line and a holding line for supporting and operating said grab, one of said lines passing over said carrier in one direction to give a tendency to move in one direction and the other of said lines passing over said carrier in the other direction to give said carrier a tendency to move in the opposite direction whenever either of said lines is stressed, a sheave at each end of the supporting means over which one or the other of the lines pass, a pair of slack takers over which one or the other of said lines are oppositely turned, drums to which said lines are carried from said slack takers for taking in or releasing either or both of said lines, reducing connections between said carrier and said slack takers for operating them in a direction opposite to the movement of said carrier but at such proportioned speed that the scope taken up or given out by said slack taker shall not equal that given out or taken up by said carrier.

4. In a device of the class described, a load supporting carrier, supporting means for said carrier, load supporting means associated with said carrier so as to give it a tendency to traverse, means so associated with said carrier and said load supporting means and actuated by said load supporting means as to give said carrier an unequal tendency to traverse in the opposite direction to that of the tendency of said load supporting means acting direct, and means for operating said load supporting means.

5. In a device of the class described, a load supporting carrier, supporting means for said carrier, load supporting means associated with said carrier so as to give it a tendency to traverse, means so associated with said carrier and said load supporting means and actuated by said load supporting means as to give said carrier an unequal tendency to traverse in the opposite direction to that of the tendency of said load supporting means acting direct, means for operating said load supporting means and independent means for controlling or preventing any traversing movement.

6. In a device of the class described, a pair of load supporting means, a load supporting carrier, a slack taker mechanically connected with said carrier for movement therewith simultaneously at such relative speed that the scope of the supporting means taken up or yielded by said slack taker shall not equal the scope yielded or taken up by said carrier, means for operating said load supporting means, and means for supporting said device, one of said load supporting means when stressed tending to actuate the movement of the carrier and slack taker in one direction, and the other of said supporting means when stressed tending to actuate the movement of the carrier and slack taker in the opposite direction.

7. In a device of the class described, load supporting means and a load supporting carrier, a slack taker operatively associated for movement therewith at a relative speed, such that the scope taken up or yielded by it shall not equal the slack yielded or taken up by the said carrier, means for operating said load supporting means and means for supporting said device, said load supporting means when stressed actuating said carrier and slack taker, and independent means for controlling this movement and causing the movement of the carrier in an opposite direction.

8. In a device of the class described, load supporting means, a load supporting carrier, means for operating said load supporting means, means associated with said load supporting means and said carrier to actuate and control the traversing movement of said carrier in either direction through the operation of the load supporting means, and means for limiting the maximum traversing tendency to less than the stress of the supporting means.

9. In a device of the class described, a load supporting carrier, load supporting means associated with said carrier so as to give it a tendency to traverse, means so associated with said carrier and said load supporting means and actuated by said load supporting means as to give said carrier an unequal tendency to traverse in the opposite direction to that of the tendency of the load supporting means and means for operating said load supporting means.

In testimony whereof I affix my signature in presence of two witnesses.

RAYMOND F. BENNETT.

Witnesses:
ALBERT B. HALL,
WILLIAM F. LITTLE.